US011871761B2

(12) United States Patent
De Paepe et al.

(10) Patent No.: US 11,871,761 B2
(45) Date of Patent: *Jan. 16, 2024

(54) STRUCTURED FAT SYSTEM

(71) Applicant: CARGILL, INCORPORATED, Wayzata, MN (US)

(72) Inventors: Jeroen De Paepe, Zottegem (BE); Serpil Metin, Plymouth, MN (US); Paul Raymond Smith, Waterloo (BE); Sarah Veelaert, Eppegem (BE)

(73) Assignee: Cargill, Incorporated, Wayzata, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/163,999

(22) Filed: Feb. 3, 2023

(65) Prior Publication Data
US 2023/0180783 A1 Jun. 15, 2023

Related U.S. Application Data

(62) Division of application No. 14/896,839, filed as application No. PCT/US2014/041522 on Jun. 9, 2014, now Pat. No. 11,596,160.

(60) Provisional application No. 61/833,106, filed on Jun. 10, 2013.

(51) Int. Cl.
*A23D 7/005* (2006.01)
*A23D 9/007* (2006.01)

(52) U.S. Cl.
CPC ......... *A23D 7/0053* (2013.01); *A23D 7/0056* (2013.01); *A23D 9/007* (2013.01)

(58) Field of Classification Search
None
See application file for complete search history.

(56) References Cited

U.S. PATENT DOCUMENTS

| | | |
|---|---|---|
| 2,131,064 A | 9/1938 | Musher |
| 3,023,104 A | 2/1962 | Battista |
| 3,508,926 A | 4/1970 | Sanford |
| 3,881,991 A | 5/1975 | Kurimoto |
| 4,112,125 A | 9/1978 | Chesnut |
| 4,382,967 A | 5/1983 | Koshida |
| 4,492,714 A | 1/1985 | Cooper |
| 4,587,131 A | 5/1986 | Bodor |
| 4,591,507 A | 5/1986 | Bodor |
| 4,609,555 A | 9/1986 | Becher |
| 4,810,307 A | 3/1989 | Caton |
| 4,814,195 A | 3/1989 | Yokoyama |
| 4,985,082 A | 1/1991 | Whistler |
| 5,051,271 A | 9/1991 | Iyengar |
| 5,275,837 A | 1/1994 | Eastman |
| 5,374,442 A | 12/1994 | Harris |
| H1395 H | 1/1995 | Prosser |
| 5,378,286 A | 1/1995 | Chiou |
| 5,395,640 A | 3/1995 | Harris |
| 5,436,019 A | 7/1995 | Harris |
| 5,439,697 A | 8/1995 | Gonzalez-Sanz |
| 5,445,678 A | 8/1995 | Whistler |
| 5,486,507 A | 1/1996 | Whistler |
| 5,576,043 A | 11/1996 | Stankus |
| 5,651,828 A | 7/1997 | Whistler |
| 5,676,994 A | 10/1997 | Eskins |
| 5,679,395 A | 10/1997 | Finocchiaro |
| 5,695,806 A | 12/1997 | Bateman |
| 5,726,161 A | 3/1998 | Whistler |
| 5,912,031 A | 6/1999 | Fitchett |
| 6,013,301 A | 1/2000 | Wursch |
| 6,060,107 A | 5/2000 | Reddy |
| 8,029,847 B2 | 10/2011 | Kodali |
| 8,252,358 B2 | 8/2012 | Piatko |
| 2003/0202996 A1 | 10/2003 | Bazin |
| 2005/0123668 A1 | 6/2005 | Kodali |
| 2005/0158839 A1 | 7/2005 | Borchert |
| 2008/0213412 A1 | 9/2008 | Yamada |
| 2010/0136182 A1 | 6/2010 | Rabault |
| 2010/0330369 A1 | 12/2010 | Veelaert |
| 2011/0281015 A1 | 11/2011 | Higgins |
| 2011/0311704 A1 | 12/2011 | Barey |
| 2012/0053251 A1 | 3/2012 | Ervin |
| 2013/0251883 A1 | 9/2013 | Ohsumi |

FOREIGN PATENT DOCUMENTS

| | | |
|---|---|---|
| CN | 104717887 A | 6/2015 |
| EP | 0146174 B1 | 7/1987 |
| EP | 0537126 A2 | 4/1993 |

(Continued)

OTHER PUBLICATIONS

Boutboul et al. "influence of the nature and treatment of starch on aroma retention". Carbohydrate Polymers 47 (2002) 73-82. (Year 2002).

Neil, M.H. "The Story of Crisco", The Procter & Gamble Co., Cincinnati OH, 1914, p. 121.

Perez et al. "The molecular structures of starch components and their contribution to the architecture of starch granules: a comprehensive review". Starch 2010, 62, 389-420. (Year: 2010).

(Continued)

*Primary Examiner* — Jenna A Watts

(57) ABSTRACT

A filling, coating or spread for use in food applications comprising a structured fat system, wherein the structured fat system comprises from 10 w/w % to 90 w/w % of a lipid and from 10 w/w % to 90 w/w % of an edible porous particle, wherein the lipid is present as a continuous phase in said structured fat system. The use of a structured fat system for reducing the trans- and saturated fat content of a filling, coating or spread, wherein the structured fat system comprises from 10 w/w % to 90 w/w % of a lipid and from 10 w/w % to 90 w/w % of an edible porous particle, wherein the lipid is present as a continuous phase in said structured fat system.

12 Claims, No Drawings

(56) References Cited

FOREIGN PATENT DOCUMENTS

| | | |
|---|---|---|
| EP | 0420315 B1 | 11/1993 |
| EP | 2241189 B1 | 2/2012 |
| JP | 05103589 A | 4/1993 |
| JP | 06105652 A | 12/1994 |
| WO | 2006029080 A2 | 3/2006 |
| WO | 2007017593 A2 | 2/2007 |

OTHER PUBLICATIONS

Suika et al. Characteristics of pores in native and hydrolyzed starch granules, 2010, 62- 229-235 (Year 2010).

Sujka, M. et al. "a-Amylolysis of native potato and corn starches-SEM, AFM, nitrogen and iodine sorption investigations", LWT—Food Science and Technology, 42, (2009) 1219-1224.

Sujka, M. et al. "Starch granule porosity and its changes by means of amylolysis", Int. Agrophysics, 2007, 21, 107-113.

STRUCTURED FAT SYSTEM

CROSS REFERENCE TO RELATED APPLICATIONS

This application is a Divisional application of U.S. application Ser. No. 14/896,839, filed Dec. 8, 2015, now U.S. Pat. No. 11,596,160, which is a national phase application of PCT Application No. PCT/US2014/041522, filed Jun. 9, 2014, which claims the benefit of U.S. Provisional Application No. 61/833,106, filed Jun. 10, 2013, each of which is incorporated by reference herein in its entirety.

FIELD OF THE INVENTION

The invention relates to a filling, coating or spread for use in food applications comprising a structured fat system. The invention also relates to the use of a structured fat system for reducing the trans- and saturated fat content of a filling, coating or spread.

BACKGROUND OF THE INVENTION

Solid fat systems are useful in many food applications in order to provide structure and stability. Solid fat systems contain lipid in solid form, in order to have the required functionality.

Nowadays, many oils are made solid through hydrogenation. Hydrogenation is a process commonly used to treat vegetable oils in order to increase their functionality by making them harder and of a comparable texture to butter for example. This process increases the saturated fatty acid content of the oil. Saturated fatty acids are fatty acids which do not contain any double bonds between the carbon atoms of the fatty acid chain. During the hydrogenation process, trans-fatty acids are also formed. Trans-fatty acids are unsaturated fatty acids in which the hydrogen atoms of a double-bond, are located on opposite sides of the molecule. Generally they are only found in low amounts in naturally occurring oils and fats. A trans fat is an unsaturated fat with trans-isomer fatty acids.

Traditionally, the food industry is using solid fat systems based on animal fats (like butter or lard) which are rich in saturated fatty acids, harder vegetable oils (like palm oil) which are rich in saturated fatty acids and hydrogenated vegetable oils (from soybean or sunflower oil for example) which can be rich in trans fatty acids and saturated fatty acids. These hydrogenated oils have been subject to intensive research and studies have shown that the excessive consumption of these types of fats is one of the main causes of modern diseases such as cardiovascular diseases, obesity and some types of cancer. Industry is put more and more under pressure to reduce the amount of unhealthy fats in all kind of food applications. With this problem in mind, a lot of systems have been developed to replace trans-fat and/or saturated fat in food applications; some of them being entirely free of fat. Most of them have a paste-like structure that mimics the structure of fat. In general, these fat replacers are indicated in the replacement of fat for a very limited range of food applications.

Fat replacement is a difficult issue because fat plays a very important role in the manufacture and in the organoleptic properties of food. It also imparts the final aspect of many food applications. In fillings, coatings and spreads, fat plays the role of plasticizer and tenderizer and confers the right texture to the filling, coating or spread and to the final food product as a whole. It is desired that the fat does not leak out of the filling and does not separate from the filling, coating or spread.

U.S. Pat. No. 8,029,847 132 provides a trans-fat replacement system.

One of the properties of oils is that they are free of trans-fatty acids and free of saturated fatty acids. Unfortunately, oils do not have the necessary structure for imparting a specific texture to food applications. Oils are difficult to use in fillings, coatings or spreads because the risk of leaking out.

There is thus a need for providing a saturated and trans-fat replacement system based on oil, that can be used in fillings, coatings or spreads for use in food applications, and which mimic the properties of the traditional fat or fat system.

SUMMARY OF THE INVENTION

In one aspect, the present invention relates to a filling, coating or spread for use in food applications comprising a structured fat system, wherein the structured fat system comprises from 10 w/w % to 90 w/w % of a lipid and from 10 w/w % to 90 w/w % of an edible porous particle, wherein the lipid is present as a continuous phase is said structured fat system.

In another aspect, the present invention relates to use of a structured fat system for reducing the trans- and saturated fat content of a filling, coating or spread, wherein the structured fat system comprises from 10 w/w % to 90 w/w % of a lipid and from 10 w/w % to 90 w/w % of an edible porous particle, wherein the lipid is present as a continuous phase in said structured fat system.

DETAILED DESCRIPTION

The present invention relates to a filling, coating or spread for use in food applications comprising a structured fat system, wherein the structured fat system comprises from about 10 w/w % to about 90 w/w % of a lipid and from about 10 w/w % to about 90 w/w % of an edible porous particle, wherein the lipid is present as a continuous phase in said structured fat system.

As used herein, the term "filling" means an edible substance or mixture used to fill a cavity in another food item. Examples of fillings are peanut butter filling, praline filling, bonbon filling, caramel filling, butter cream filling, cereal filling, fillings for extruded snacks, fillings for chocolate bars, cheese or cheese cream fillings, fillings for jellies or chewing gums. Preferably, the filling of the present invention is a confectionery filling.

As used herein, the term "coating" means a layer of an edible substance or mixture which is applied as a layer onto a food item. The layer can be applied as a liquid or as a solid. In some embodiments, the coating is applied to only portions of the food item. In other embodiments, the coating can completely encase the food item and thus encapsulate the food item. One example of a coating is icing or frosting which is a sweet, often creamy, glaze typically made of sugar with a liquid (water or milk) that is often enriched with ingredients such as butter, egg whites, cream cheese or flavorings.

As used herein, the term "spread" means a food product that is literally spread, typically with a knife onto another food item such as e.g. bread or crackers. For the purpose of the present invention, a spread does not include margarine. Preferred spreads of the present invention include chocolate spreads, nut-based spreads (peanut butter spread, almond butter spread, hazelnut spread), speculoos spreads, cheese or cream-cheese spreads, and savoury spread.

In one embodiment, the structured fat system comprises from about 10 w/w % to about 50 w/w %, preferably from about 15 w/w % to about 40 w/w %, even more preferably from about 20 w/w % to about 35 w/w % of a lipid, and from about 50 w/w % to about 90 w/w %, preferably from about 60 w/w % to about 85 w/w %, more preferably from about 65 w/w % to about 80 w/w % of an edible porous particle. In one preferred embodiment, the structured fat system comprises from about 25 w/w % to about 35 w/w % of a lipid and from about 65 w/w % to about 75 w/w % of an edible porous particle.

In another embodiment, the structured fat system comprises from about 50 w/w % to about 90 w/w %, preferably from about 60 w/w % to about 85 w/w %, even more preferably from about 65 w/w % to about 80 w/w % of a lipid, and from about 10 w/w % to about 50 w/w %, preferably from about 15 w/w % to about 40 w/w %, more preferably from about 20 w/w % to about 35 w/w % of an edible porous particle. In one preferred embodiment, the structured fat system comprises from about 65 w/w % to about 75 w/w % of a lipid and from about 25 w/w % to about 35 w/w % of an edible porous particle.

In some embodiments, the fat system is present in the filling, coating or spread in an amount of from about 10 w/w % to about 75 w/w % in the composition, more preferably in an amount of from about 15 w/w % to about 60 w/w %, even more preferably in an amount of from about 20 w/w % to about 50 w/w %. Most preferably the fat system is present in the filling, coating or spread in an amount of from about 25 w/w % to about 45 w/w %.

Structured Fat System

The term 'system' is used in the present invention to emphasize that the fat system comprises more than one ingredient, chemically and biologically not necessarily related to one another, which should be present in certain ratios and which should interact in a certain particular way.

In the fat system, the interaction between the lipid and the porous edible particle must be such that the lipid forms a continuous, i.e. substantially non interrupted phase, wherein the porous edible particles are distributed. The porous edible particles act as a network builder structuring the lipid phase and providing a structured fat system. Thus the fat system is structured by the presence and configuration of the porous edible particles acting as and replacing fat crystals.

The structured fat system of the present invention preferably has a hardness of from about 0.5 kg to about 2.5 kg. Preferably, the hardness is from about 1 kg to about 2 kg and more preferably from about 1.4 kg to about 1.8 kg.

The structured fat system of the present invention may also be characterized by its maximum elastic and loss modulus. The maximum elastic modulus is preferably from about 150 000 Pa to about 3 000 000 Pa and more preferably from about 1 500 000 to about 3 000 000 Pa and even more preferably from about 2 000 000 Pa to about 3 000 000 Pa. The maximum loss modulus is preferably from about 40 000 Pa to about 400 000 Pa and more preferably from about 200 000 Pa to about 300 000 Pa.

The structured fat system of the present invention can also be characterized by its elastic and loss modulus at its melting point. The elastic modulus is preferably from 200 Pa to 1500 Pa and more preferably from 600 Pa to 1 200 Pa. The loss modulus is preferably form 200 Pa to 1500 Pa and more preferably form 600 Pa to 1200 Pa.

Lipid

The lipid of the structured fat system comprises oil, fat or mixtures thereof. In one embodiment, the lipid comprises oil and fat. Oil is a triglyceride in liquid form at room temperature (from about 20° C. to about 25° C.) while fat is a triglyceride in solid or semi-solid form of at room temperature.

The oil can be any edible oil, such as sunflower oil, peanut oil, high oleic sunflower oil, corn germ oil, wheat kernel oil, rapeseed oil, safflower oil, flaxseed oil, soybean oil, palm kernel oil, palm olein, canola oil, cottonseed oil, fish oil, algal oil, hazelnut oil, almond oil, macadamia oil, rice bran oil, and mixtures of two or more thereof.

The fat can be any edible fat, such as butter, lard, tallow, butter oil, cocoa butter, palm stearin, coconut oil, palm oil, palm kernel oil, shea oil, illipe oil, sal oil, kokum gurgi oil, mango kernel oil partially hydrogenated vegetable oil, such as partially hydrogenated fractionated palm kernel oil, fully hydrogenated vegetable oil, hydrogenated fish oil and mixtures thereof. Preferably the fat is rich in saturated fat.

Porous Edible Particle

The porous edible particle can be any suitable porous edible particle. Preferably, the porous edible particle is selected from the group consisting of starch, protein, fibre, hydrocolloid, cocoa powder, and combinations thereof. A particle for the purpose of the present invention can also be an aggregate of particles.

The porous edible particle is an edible particle having pores wherein the pores can be in the form of holes present on the surface of the particle and/or in the form of interconnected cavities through the particle and/or in the form of a solid foam-like structure.

In some embodiments, the porous particle for the purpose of the present invention has an oil absorption capacity of from about 5% to about 50%, preferably from about 5% to about 40%, more preferably from about 10% to about 35%, even more preferably from about 15% to about 30% and yet even more preferably from about 20% to about 25%.

In some embodiments, the porous edible particle for the purpose of the present invention preferably has an average diameter or an average equivalent diameter of from about 1 μm to 500 μm. In some embodiments, the average diameter or the average equivalent diameter is preferably from about 50 μm to about 375 μm, more preferably from about 100 μm to about 350 μm, yet even more preferably from about 100 μm to about 300 μm. When the structured fat system is used in confectionery or in food applications where a smooth, soft texture is desired, the average diameter or average equivalent diameter is preferably less than 50 μm, more preferably less than 25 μm, even more preferably less than 20 μm and most preferably less than 15 μm. The equivalent diameter is used for non spherical particles and is numerically equal to the diameter of a spherical particle having the same density as the particle under test. The porous particle can also be characterized by its particle size distribution.

In some embodiments, a porous particle for the purpose of the present invention may have a specific surface area, as measured with BET method, of less or equal than about 2 $m^2/g$, preferably from about 0.1 $m^2/g$ to about 2 $m^2/g$, more preferably from about 0.2 $m^2/g$ to about 2 $m^2/g$, even more preferably from about 0.2 $m^2/g$ to about 1.5 $m^2/g$, yet even more preferably from about 0.2 $m^2/g$ to about 1.2 $m^2/g$. In some embodiments, the porous particle of the present invention has a specific surface area of from about 0.5 $m^2/g$ to about 1.2 $m^2/g$.

In some embodiments, the porous particles for the purpose for the present invention may have a loose density of from about 0.2 $g/cm^3$ to about 0.8 $g/cm^3$, preferably from about 0.2 g/cm³ to about 0.6 g/cm³, more preferably from about 0.2 g/cm³ to about 0.5 g/cm³, even more preferably from about 0.3 g/cm³ to about 0.5 g/cm³.

Further, the average pore size of the porous particle is typically from about 1 µm to about 100 µm, preferably from about 1 µm to about 20 µm. The average pore size can for example be measured with a suitable microscope.

The porous edible particle can be obtained by any method suitable to modify an edible particle so as to create pores, holes or openings in the structural lattice of the edible particle. The porosity can be more or less extensive. The porosity is less extensive when the pores, holes or openings are merely superficially present in the particle. The porosity is extensive when the pores, holes or openings are in the form of interconnecting cavities through the particle. Any porosity between these two extremes can be obtained by adjusting the production method. Such methods are for example freeze drying, spray drying, roll drying, extrusion and partial enzymatic degradation. The porous edible particles can be obtained by spray drying different types of particles, for example different types of starch granules, with small amounts of bonding agents such as proteins, gelatine, carboxymethylcellulose, guar, locust bean gum, starch dextrin, pectin, maltodextrin, alginate.

In one preferred embodiment, the porous edible particle is based on starch.

Suitable sources of starch for use in the present invention are corn, pea, potato, sweet potato, sorghum, banana, barley, wheat, rice, sago, amaranth, tapioca, arrowroot, canna, and low amylose (containing no more than about 10% by weight amylose, preferably no more than 5% by weight amylose) or high amylose (containing at least about 40% by weight amylose) varieties thereof. Genetically modified varieties of these crops are also suitable sources of starch. A preferred starch for use herein is starch with an amylose content below 40% by weight, including waxy corn starch with less than 1% by weight amylose content. Particularly preferred sources include corn, and potato.

The starch of the starch particle may be chemically modified, enzymatically modified, modified by heat treatment, by physical treatment, by surface treatment, coating or co-processing. The term "chemically modified" or "chemical modification" includes, but is not limited to crosslinking, modification with blocking groups to inhibit retrogradation, modification by the addition of lipophilic groups, acetylated starches, hydroxyethylated and hydroxypropylated starches, inorganically esterified starches, cationic, anionic and oxidized starches, zwitterionic starches, starches modified by enzymes and combinations thereof. Heat treatment includes for example pregelatinization. Thus the starch particle can comprise starch in the granular state or in the non granular state, i.e. the granular state of the starch has been disrupted by physical, thermal, chemical or enzymatic treatment.

A porous starch particle can be a porous starch granule. Porous starch granules can be obtained as follows. The starch granules have been modified by processing, preferably by enzyme treatment, resulting in the granule having holes, pores or openings which allow smaller molecules to enter the interstices of the starch granules. The starch granules suitable for modification and for use in the present invention may comprise any starch which is capable of being modified to increase pore volume or surface area, for example, corn or potato starch. An example of porous starch granules suitable for use in the present invention are starch granules modified by treatment, usually by amylolytic enzymes, to increase the pore volume and thereby producing a microporous starch matrix. Any of a wide variety of art-recognized alpha-amylase or glucoamylases including those derived from *Rhizopus niveus, Aspergillus niger*, and *Rhizopus oryzae* and *Bacillus subtilis* and alpha-amylases and glucoamylases of animal origin, can be used. Microporous starch granules prepared by the action of acid or amylase on granular starch are well known in the literature, see for example, Starch Chemistry and Technology, Whistler, Roy L., $2^{nd}$ Edition (1984), Academic Press, Inc. New York, N.Y. These methods and others, as well as those disclosed herein, are suitable for preparing a porous starch matrix. The duration of enzyme treatment necessary to produce microporous starch matrices suitable for use in the present invention depends on a number of variables, including the source of starch, species and concentration of amylases, treatment temperature, and pH of the starch slurry. The progress of starch hydrolysis can be followed by monitoring the D-glucose content of the reaction slurry.

A porous starch granule may have a diameter or an equivalent diameter of from about 1 µm to about 500 µm, preferably from about 1 µm to about 100 µm and more preferably from about 1 µm to about 50 µm.

A porous starch granule may have a BET specific surface area of from about 0.2 m²/g to about 2 m²/g, preferably from about 0.2 m²/g to about 1.5 m²/g, even more preferably from about 0.2 m²/g to about 1.2 m²/g. Most preferably, the porous starch granule has a BET specific surface area of from about 0.5 m²/g to about 1.2 m²/g.

The porous starch particle can be a porous particle comprising non granular starch material. Non granular starch material, as used herein, refers to a starch material consisting of particles that do not have a granular shape. A granular shape is intended to mean a roughly spheroid or ellipsoid shape and includes spherical particles that have indentations in one or more portions thereof, such as the spherical starch particles produced by a conventional spray-drying process. A flake-shaped starch particle, when used herein, is a particle that has lost its granular structure and has a heterogeneous shape in the form of irregular flat or thick plates or sheets. Typically, roll-drying or drum-drying processes generate such flake-shaped starch particles.

A porous non-granular starch particle may have a diameter or an equivalent diameter of from about 1 µm to about 500 µm, preferably from about 50 µm to about 200 µm and more preferably from about 100 µm to about 150 µm.

The BET specific surface area of the non-granular starch material is typically not higher than about 0.5 m²/g, preferably it is less than or equal to about 0.4 m²/g, and more preferably less than or equal to about 0.3 m²/g.

Optional Ingredients

The structured fat system of the present invention may further comprise optional ingredients. Examples of optional ingredients include, but are not limited to, texturizers, flavouring agent, cacao solids and cacao solid replacers, carob, malt, milk solids, sweetener, salt, dextrose monohydrate, nut, fruit, protein, caramel, colorant, vitamin, minerals, antioxidants, healthy lipids and the like. Texturizer can be any hydrocolloid, such as e.g. xanthan gum, carrageenan, locust bean gum, alginate, and the like. Flavouring agent can be any suitable synthetic or natural flavourings such as vanilla, caramel and/or almond flavourings, fruit extracts, vegetable extracts such as tomato, carrot, onion and/or garlic extracts, spices, herbs, etc. Cacao solids can be full fat or defatted cacao powder. Milk solids can be full fat or defatted milk powder. Sweetener include any type of sweetener in liquid or powder form, such as e.g. saccharose, glucose syrup, fructose syrup, maltose syrup, maple syrup, corn syrup, honey, sugar alcohols, high intensive sweeteners and the like. Sugar alcohols can be e.g. sorbitol, maltitol, erythritol and the like. High intensive sweeteners can be e.g. aspartame, acesulfame-K, glycosides such as Stevioside or Rebaudioside A. Nut can be e.g. hazelnut, peanut, almond, macademia, pecan, walnut, milled (flour) or entire. Fruit can be any dried fruit or fruit pieces, confit fruit or confit fruit pieces. Proteins can be vegetable protein such as gluten and soy protein, dairy protein such as casein or whey protein, and the like. Colorants include natural and synthetic colorants. Vitamins include An, D3, E, K1, C, B1, B2, B5, B6, B12 and PP, folic acid and biotin and minerals include sodium, potassium, calcium, phosphorus, magnesium, chloride, iron, zinc, copper, manganese, fluorine, chromium, molybdenum, selenium and iodine. Antioxidants include tocopherols, rosemary extract. Healthy lipids include high omega oils, fish oils, algal oils, vegetable oils.

Use

The present invention further relates to the use of a structured fat system for reducing the trans- and saturated fat content of a filling, coating or spread, wherein the structured fat system comprises from 10 w/w % to 90 w/w % of a lipid and from 10 w/w % to 90 w/w % of an edible porous particle, wherein the lipid is present as a continuous phase in said structured fat system. In some embodiments, the structured fat system can reduce the trans- and saturated fat content of a filling, coating or spread with at least 10 w/w %, preferably at least 20 w/w %, more preferably at least 40 w/w %. In some embodiments, the trans- and saturated fat content can be reduced by even more than 60 w/w %.

In some embodiments, the structured fat system of the present invention may also be used to lower the sugar content of a filling, coating or spread.

Process of Making the Structured Fat System

In some embodiments, the structured fat system is made by mixing a liquid or melted lipid, porous edible particles, and optional ingredients as described hereinbefore. Mixing is preferably carried out until a homogeneous mixture is obtained. The mixture is then solidified.

Mixing is done with the objective to incorporate the lipid into the pores of the porous particles. Mixing the lipid and the porous edible particles can be done at any suitable processing temperature. In some embodiments, it is done at a temperature of from 60° C. to 90° C. But in other embodiments, it can be done at room temperature.

Mixing the lipid and the porous edible particles can be done by any suitable method for mixing a powder and a liquid, such as mixing with static, passive, in-line or dynamic mixers, such as high speed mixers and high shear mixers. Preferably, use is made of high speed mixing.

The lipid to be mixed should be liquid at processing temperature. When the lipid is not liquid at processing temperature, it can be first melted.

Solidifying the mixture can be done by any suitable method known in the art such as for example cooling to room temperature, cooling in an ice bath, refrigerating or blast cooling, until the mixture is solid or semi-solid.

The structured fat system can then be mixed with the other ingredients that are typically used for making the filling, coating or spread.

Alternatively, the lipid (in liquid or melted form), edible porous particles and optional ingredients can be mixed directly with those other ingredients that are typically used for making the filling, coating or spread.

Methods of Measurement

The oil absorption capacity of a porous particle is measured by centrifuging a given amount of a sample of porous particle in oil dispersion, removing the oil that has not bound to the porous particle, subjecting the remaining oil-loaded porous particle to high centrifugal forces and determining the amount of oil, which remained bound to the starch sample by assessing the weight of the obtained centrifuges starch:

25 g ($W_0$) of the porous particle is weighed and 25 g of oil is added and thoroughly mixed with a spoon for 2 minutes to give and oil-porous particle mixture. In case of a too high viscosity, an additional amount of oil is added. a 750 ml round bucket centrifuge bottle is filled with about 360 g native potato starch and a folded filter paper (150 mm diameter, Machery-Nagel MN 614) is unfolded and placed on top of the potato starch (in a small hole, to ensure that the filter paper will stay in position during the subsequent centrifugation). The prepared oil-porous particle mixture is then poured onto the filter paper, followed by centrifugation at 3434×g for 10 minutes in a Heraeus Multifuge 3S centrifuge. After completion of the centrifugation, the filter paper with the starch-porous particle sample is withdrawn from the centrifuge bottle, and the starch-porous particle sample remaining on the filter was carefully removed and the weight $W_s$ was measured. The oil absorbed by the sample is calculated as $W_s-W_0$ and the oil absorption capacity (%) is expressed as $(W_s-W_0)/W_0 \times 100\%$ (with a deviation of about 3%).

The loose density of a porous particle is measured as follows:

A metal beaker of 100 cm$^3$ is filled with the material under test. It is then weighed and the density is calculated in g/cm$^3$.

The specific surface area of a porous particle is measured by nitrogen absorption in a Gemini II 2370 Surface Area Analyzer (Micromeritics NV/SA, Brussels, Belgium). The multi-point (11 points by convention) BET-method (Bruauner, Emmett and Teller, J. Am. Chem. Soc. 60:309-319 (1983)) is used to determine the total available surface area (BET specific surface area) (m$^2$/g).

The particle size distribution of the porous particle is determined by a sieve analysis using sieves with different openings. The respective sieve fractions on the sieves are weighted and divided by the total weight of the sample to give a percentage retained on each sieve.

The hardness of the structured fat system is measured as follows:

Hardness of the structured fat system is measured with the TAXTplus texture analyser (Stable Micro Systems, Godalming, UK). A spindle of 0.5 cm diameter is penetrated into the samples up to 1.5 cm. The samples are measured at 20° C.

The rheology is measured as follows:

Rheological measurements are performed using a modular compact Rheometer model MCR 300 (Anton Paar Physica, Germany).

A configuration with a 25 mm profiled Titanium flat plate (PP 25/P) with a gap of 1 mm to a serrated lower plate is used.

For the temperature sweep measurements, constant amplitude of 0.1 mrad with an angular frequency of 10 rad/s is applied.

The temperature of the system is varied at 5° C./minute from 20 to 80° C. Elastic and loss modulus (G' and G" respectively) are measured.

The invention is illustrated with the following examples.

Examples

Unless otherwise provided, all percentages as described in the examples are weight percentages.

The following chocolate fillings were made.

|  | Ref | T1 | T2 | T3 |
|---|---|---|---|---|
| Chocolate dry mix | 65 | 52.5 | 57.5 | 55 |
| Palm fat | 15 | 5 | 5 | 5 |
| Rapeseed oil | 20 | 30 | 30 | 30 |
| Porous corn starch (Starrier P) |  | 12.5 | 7.5 | 10 |
| Sum powders | 65 | 65 | 65 | 65 |
| Total | 100 | 100 | 100 | 100 |

Chocolate dry mix is a blend of the non-fat components of chocolate. It contains 8.67% natural cocoa powder, 57.76% sugar, 33.47% skimmed milk powder and 0.1% vanilla. These components are finely milled together.

The reference is a typical blend for a base as a chocolate filling or a chocolate spread.

The ingredients were blended and mixed at about 40-45° C. They were then allowed to cool to 20° C.

The reference gave a product which is a soft semi-solid. Also samples T1-T3 were semi-solid in texture.

In T1-T3 the amount of palm fat was reduced from 15% to 5% corresponding to a reduction of 67% of the saturated fat content compared to the reference.

Samples T1 to T3, according to a sensory panel, had a mouthfeel that is comparable to the reference.

In comparison, T1 also has a reduced sugar content of approximately 20% versus the reference (37.54% versus 30.32%).

What is claimed is:

1. A filling, coating or spread for use in food applications comprising a structured fat system, wherein the structured fat system comprises from 60 w/w % to 85 w/w % of a lipid and from 15 w/w % to 40 w/w % of an edible porous starch comprising a plurality of pores, wherein:
   the edible porous starch is a pregelatinized starch that has been modified or treated to increase pore volume and/or surface area and has an oil absorption capacity of from 5 to 50%;
   the lipid is present as a continuous phase in said structured fat system;
   the lipid is a mixture of oil and fat;
   the edible porous starch is non-granular;
   the edible porous starch has an average pore size of about 1 μm to about 20 μm; and
   the structured fat system is present in the filling, coating, or spread in an amount from about 20 to about 50 w/w %.

2. The filling, coating or spread according to claim 1, wherein the edible porous particle has a BET surface area less than or equal to about 0.4 m$^2$/g.

3. The coating or spread according to claim 1, wherein said coating is an icing.

4. The filling according to claim 1, wherein said filling is a confectionery filling.

5. The filling according to claim 1, wherein said filling is a chocolate filling.

6. The spread according to claim 1, wherein said spread is a chocolate spread, a nut-based spread, a speculoos spread, a cheese spread, or a savoury spread.

7. The filling, coating or spread according to claim 1, wherein modifying or treating the edible porous starch includes chemical modification, enzymatic modification, modification by heat treatment, modification by physical treatment, modification by surface treatment, coating, or a combination thereof.

8. The filling, coating or spread according to claim 7, wherein the starch is enzymatically treated.

9. The filling, coating or spread according to claim 8, wherein the starch is treated with amylolytic enzymes.

10. The filling, coating or spread according to claim 1, wherein the edible porous starch has a diameter ranging between 100 μm to 150 μm.

11. The filling, coating or spread according to claim 1, wherein the structured fat system further comprises cocoa powder.

12. The filling, coating or spread according to claim 1, wherein a ratio of oil to fat in the mixtures is 6:1.

* * * * *